F. B. MULFORD.
VEHICLE WHEEL.
APPLICATION FILED SEPT. 11, 1920.
1,389,778.
Patented Sept. 6, 1921.
2 SHEETS—SHEET 1.
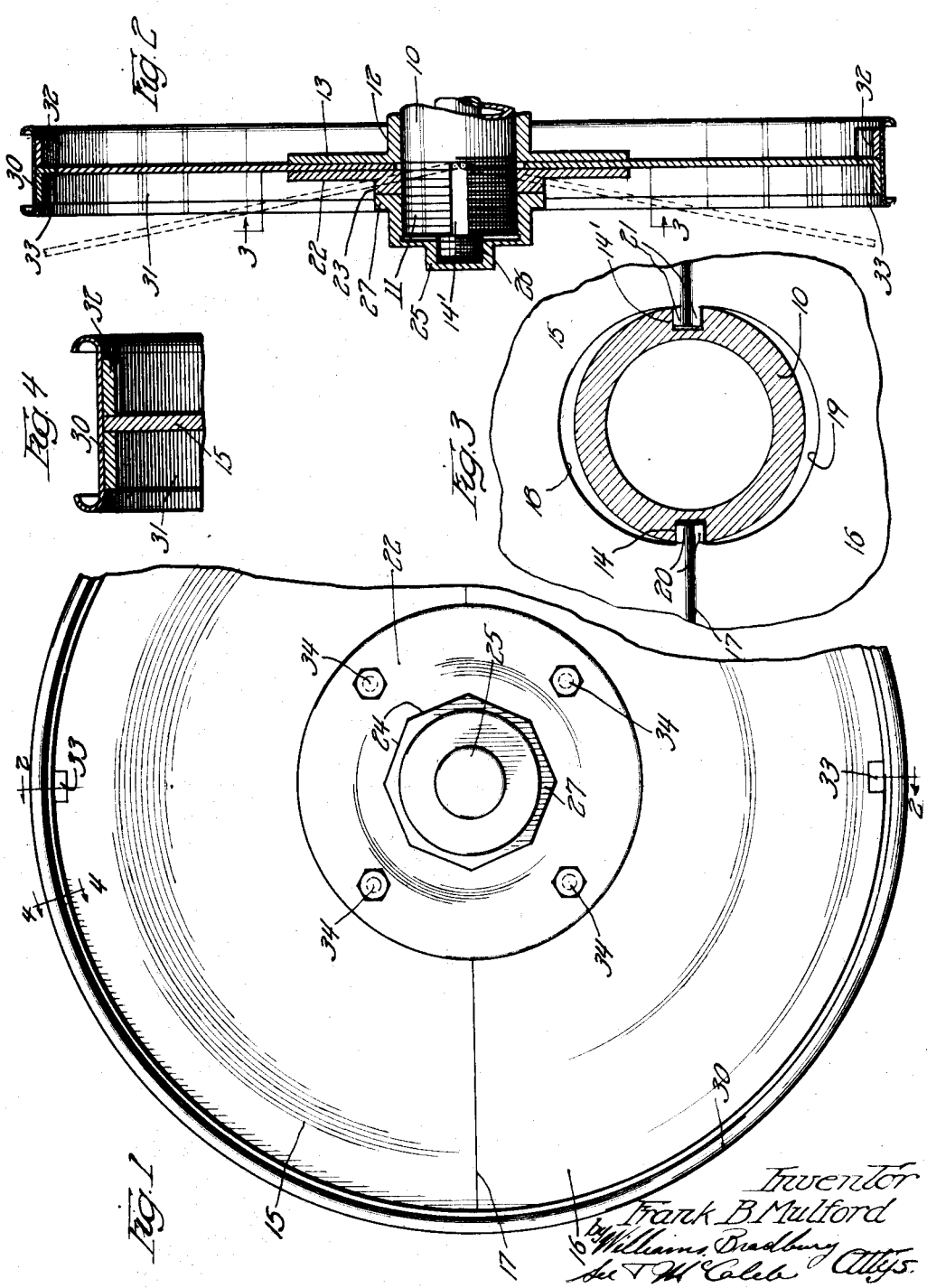

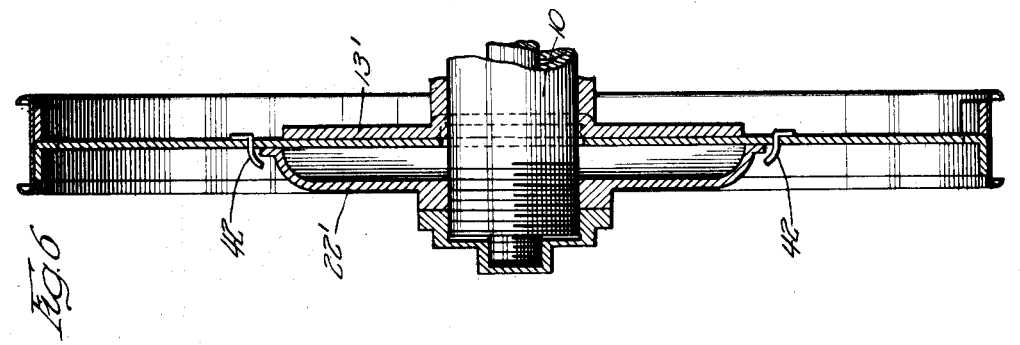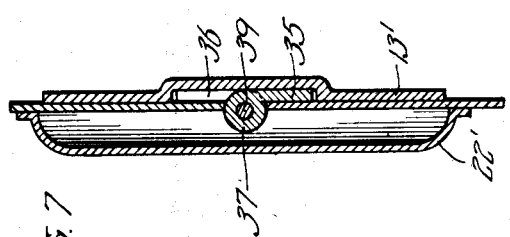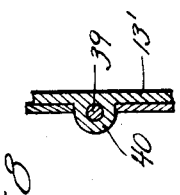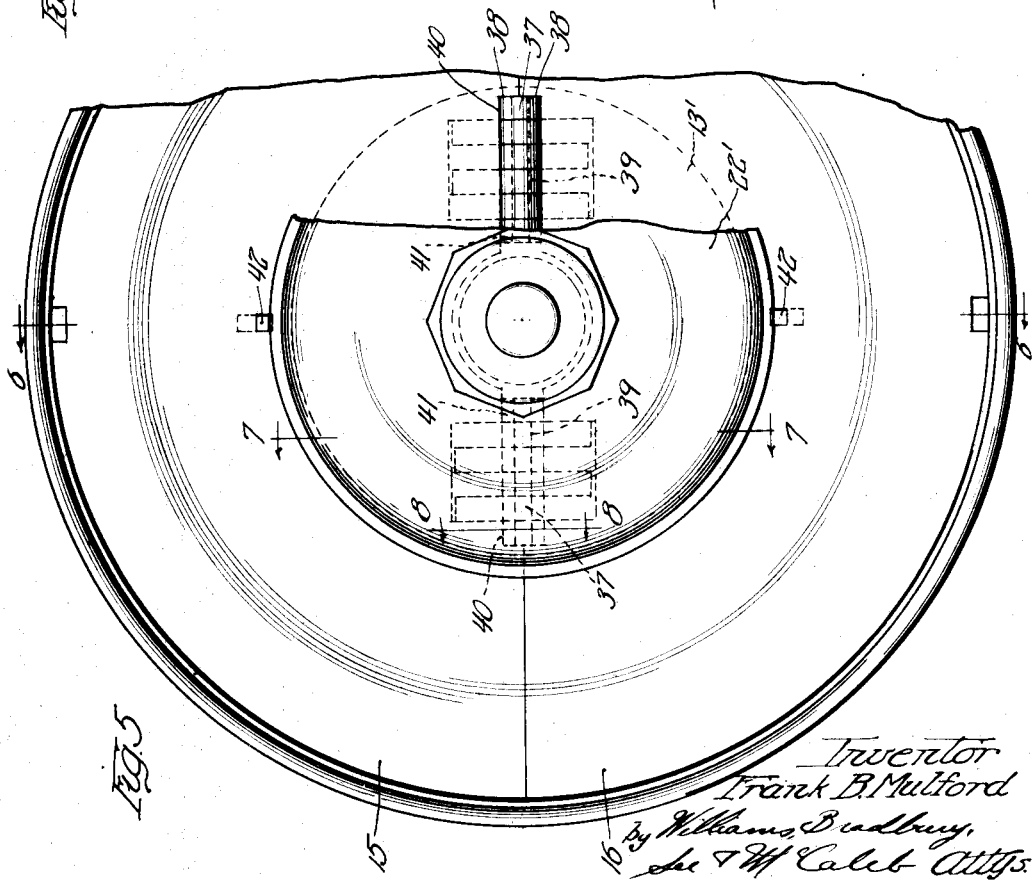

UNITED STATES PATENT OFFICE.

FRANK B. MULFORD, OF ST. LOUIS, MISSOURI.

VEHICLE-WHEEL.

1,389,778. Specification of Letters Patent. Patented Sept. 6, 1921.

Application filed September 11, 1920. Serial No. 409,525.

*To all whom it may concern:*

Be it known that I, FRANK B. MULFORD, a citizen of the United States, residing at St. Louis, in the county of St. Louis and State of Missouri, have invented certain new and useful Improvements in Vehicle-Wheels, of which the following is a full, clear, concise, and exact description, reference being had to the accompanying drawings, forming a part of this specification.

My invention relates to improvements in vehicle wheels and is particularly concerned, though not limited, to improvements in wheels of the so-called disk type.

The objects of my invention are—

First; to provide a vehicle wheel comprising a removable rim for supporting the tire of such construction that the rim and tire can be easily and quickly bodily removed as a unit.

Second; to provide a vehicle wheel comprising a hub, a rim and an expansible and contractible load supporting member connecting the hub and rim, the construction being such that by contracting or collapsing the load supporting member, the rim can be easily and quickly removed therefrom and replaced by another rim which can be easily and quickly secured to the hub by expanding the load supporting member.

Third; to provide a disk wheel comprising a hub, a load supporting disk and a rim, the said disk comprising a plurality of parts movable relatively to each other in such a manner that its periphery can be expanded against the inner periphery of the rim or contracted to permit the rim to be removed from the disk, and Fourth; to provide a wheel of the class described which is simple in construction, economical to manufacture and easy to manipulate.

Other objects of my invention will appear as this description progresses, reference being had to the accompanying drawings, in which—

Figure 1 is a side elevation of a wheel constructed in accordance with my invention, portions thereof being broken away.

Fig. 2 is a vertical central section taken on line 2—2 of Fig. 1.

Fig. 3 is an enlarged sectional detail taken on line 3—3 of Fig. 2.

Fig. 4 is an enlarged transverse section taken on line 4—4 of Fig. 1.

Fig. 5 is a side elevation of a modified form of my invention, portions thereof being broken away.

Fig. 6 is a vertical central section taken on line 6—6 of Fig. 5.

Fig. 7 is an enlarged sectional detail taken on line 7—7 of Fig. 5 and

Fig. 8 is a sectional detail on an enlarged scale taken on line 8—8 of Fig. 5.

Throughout the several figures of the drawings, similar reference characters will be used for referring to similar parts.

At the present time, wheels of the so-called disk type are so constructed that it is comparatively difficult to remove the tire rim from the wheel and consequently it is a practice of drivers of automobiles, having disk wheels to carry an entire extra disk wheel. These wheels are quite heavy and the extra wheel adds considerably to the weight to be borne by the tires. Consequently a further object of my invention is to provide a wheel of the disk type which is so constructed as to permit of the easy and quick removal of the tire rim, thereby making it possible to carry merely an extra rim and tire in place of the entire wheel.

My improved wheel comprises a hub member 10, the outer end of which is screw-threaded as indicated at 11 and the inner end of which is provided with a sleeve 12 having a flange 13 extending therefrom. The sleeve 12 may be shrunk or otherwise rigidly secured to the hub member 10. In the form of my invention illustrated in Figs. 1 to 4 inclusive, two grooves 14 and 14' are formed in the outer periphery of the hub member, said grooves being disposed diametrically opposite each other.

The disk of my improved wheel is formed in two halves 15 and 16 which have abutting edges meeting on the diameter 17. The two halves of the disk are cut away adjacent the center of the disk, as shown at 18 and 19 in Fig. 3 and form a somewhat elliptical-shaped opening for receiving the hub member 10. Pivot pins 20 and 21 are formed adjacent the abutting edges of the two parts of the disk and project into the elliptical opening formed in the disk in such a manner that when the parts 15 and 16 are assembled on the hub member, the pins 20 and 21 slide in the grooves 14 and 14', respectively.

For holding the two parts of the disk in the same plane, I provide a smaller disk 22 having a screw-threaded opening for coacting with the screw-threaded end of the hub member 10 and a boss 23 provided with facets 24 for co-acting with a wrench whereby the disk 22 can be caused to tightly clamp the disk against the flange 13. For locking the disk 22 against rotation and for holding the wheel upon the axle, I preferably provide a hub cap 25 having screw-threaded engagement with the outer end of the axle as indicated at 26 and provided with a flange 27 which bears against the boss 23 of the disk 22.

The tire rim 30 of my improved wheel may be of any suitable or convenient construction which will permit of having the abutments 31 and 32 secured to the inner periphery thereof to form a groove for receiving the edge or periphery of the disk, these abutments serving as means for preventing the lateral displacement of the rim 30 from the disk when the wheel is in use. Preferably the abutment 31 is, as shown, in the form of a continuous ring secured to the inner periphery of the wheel adjacent the outer edge thereof, while the abutments 32 merely form portions of a ring disposed substantially diametrically opposite each other and intermediate the ends of the dividing line 17. The stops 32 are of such thickness that they will not cause any considerable binding action upon the edge of the disk when the disk is deflected to the position shown in dotted outline in Fig. 2, in the manner about to be described.

When it is desired to remove the rim from the disk wheel, constructed in accordance with my invention, the hub cap 25 is removed and also the disk 22. Pressure is then placed upon the rim to move it toward the left in Fig. 2 whereupon the two parts 15 and 16 of the disk pivoting upon the pins 20 and 21 are inclined toward each other or collapsed, as shown by dotted line in Fig. 2, thereby moving the peripheries of the parts 15 and 16 inwardly sufficiently to permit them to clear the stops 32 and thus allow the rim to be withdrawn from the wheel.

To place the rim upon the disk, the two portions thereof are permitted to assume the position shown in dotted outline in Fig. 2 and the rim is then placed thereon with the groove formed by the stops 31 and 32 registering with the periphery of the disk. By pushing inwardly upon the rim, the inner edge of the stops 31 will engage the opposite sides of the two disks 15 and 16 and cause them to assume a vertical position and at the same time enter the groove formed by the stops 31 and 32. The disk 22 is then rotated to clamp the disk against the flange 13 and the hub cap 25 is secured in position to lock the disk 22 against rotation.

The elliptical shape of the opening formed by cutting away the two parts 15 and 16 at 18 and 19 is to permit these two disks to incline toward each other as shown in Fig. 2. This same result could, of course, be obtained without making these openings of elliptical shape by merely making the slots 14 and 14' somewhat wider to permit the pins 20 and 21 to move away from each other when the two portions of the disks are to be inclined.

From the above description, it will be seen that while the disk of my improved wheel expands in one direction in securing the rim thereto, it does not expand in the direction of the line 17. To insure tight contact of the rim with the disk at the ends of the line 17, I prefer to make the disk of slightly greater diameter in a direction at right angles to the line 17 than in the direction of the line 17, so that when it is expanded into place, it will tend to draw the portions of the rim adjacent the ends of the line 17 inwardly against the edge of the disk. The difference in the two diameters of the disk referred to will not be sufficient to in any way noticeably affect the operation of the wheel.

To insure a positive driving relation between the disk and the rim, I prefer to provide the stop 31 with inwardly extending lugs 33 which engage the sides of correspondingly shaped notches cut in the edges of the disk. Bolts 34 extending through the flange 13, the load supporting disk and the clamping disk 22 provide means in addition to friction for preventing the disk from slipping relatively to the hub member.

In the modified form of my invention, shown in Figs. 5 to 8 inclusive, the construction is similar to that shown in Figs. 1 to 4 inclusive, except that the pin and slot connection between the two halves 15 and 16 of the disk is omitted and these two parts are pivotally secured together by means of hinges comprising the leaves 35, 36, the eyes 37 of which are received in the notches 38 cut in the adjacent edges of the members 15 and 16 as shown in Figs. 5, 7 and 8. The ends of the pintles 39 which secure the hinge leaves 35, and 36 together, are supported in suitable lugs 40 and 41 projecting outwardly from the flange or plate 13'.

From the above description, it will be seen that the two parts 15 and 16 of the disk are pivotally mounted upon and supported by the disk 13'. They are clamped in place by means of the disk 22' which, in this form of my invention, is cup-shaped to house the eyes 37 of the hinge members. Clips 42 secured to the two portions of the disk overlap the adjacent edges of the disk 22' in such a manner that as this disk is moved outwardly on the hub member 10, the two halves of the disk are diametrically inclined toward each other and will be rigidly held in their inclined positions. Otherwise the construction shown in Figs. 5 to 8, is similar to that shown in Figs. 1 to 4.

While I have described the details of construction of the preferred embodiment of my invention, it is to be clearly understood that my invention is not limited to these details but is capable of other adaptations and modifications within the scope of the appended claims.

Having thus described my invention, what I claim is:—

1. A vehicle wheel comprising a hub member having a flange extending outwardly adjacent one end thereof, a disk mounted upon said hub-member, the said disk comprising a plurality of parts pivotally mounted to be inclined toward each other to lessen the periphery of the disk, a rim having stop members arranged in spaced relation on its inner periphery to form a groove for receiving the periphery of said disk, means threaded on said hub for clamping said disk against said flange and expanding the periphery of said disk against the inner periphery of said rim, and means for establishing a positive driving connection between said disk and said hub and rim respectively.

2. A vehicle wheel comprising a hub member having a flange extending outwardly adjacent one end thereof, a disk mounted upon said hub-member, the said disk comprising a plurality of parts pivotally mounted to be inclined toward each other to lessen the periphery of the disk, a rim, means threaded on said hub for clamping said disk against said flange and expanding the periphery of said disk against the inner periphery of said rim, and means for establishing a positive driving connection between said disk and said hub and rim respectively.

3. A vehicle wheel comprising a hub member having a flange extending outwardly adjacent one end thereof, a disk mounted upon said hub-member, the said disk comprising a plurality of parts pivotally mounted to be inclined toward each other to lessen the periphery of the disk, a rim, and means on said hub for clamping said disk against said flange and expanding the periphery of said disk against the inner periphery of said rim.

4. A vehicle wheel comprising a hub member having a flange extending outwardly adjacent one end thereof, a rigid disk mounted upon said hub-member, the said disk comprising a plurality of separate parts mounted to be moved to lessen the periphery of the disk, a rim, and means on said hub for coacting with said flange to expand the periphery of said disk against the inner periphery of said rim.

5. A vehicle wheel comprising a hub member, a disk mounted on said hub and comprising a plurality of separate relatively movable parts having abutting edges, a rim, and means on said hub for co-acting with said parts of said disk to expand or contract the periphery of said disk into or out of contact with the inner periphery of said rim.

6. A vehicle wheel comprising a hub member, a rim, a radially divided disk connecting said hub and rim, means for pivotally connecting the parts of said disk and means on said hub for bringing the periphery of said disk and said rim into and out of engagement with each other.

7. A vehicle wheel comprising a hub, a rim, a disk comprising a plurality of radially divided relatively movable parts, and means for holding said parts in co-acting relation to transmit the load from said hub to said rim.

8. A vehicle comprising a hub, a rim, and a collapsible and extensible member having a quick detachable connection with said rim and hub for transmitting the load from said hub to said rim.

In witness whereof, I hereunto subscribe my name this 7th day of September, 1920.

FRANK B. MULFORD.

Witnesses:
EDNA V. GUSTAFSON,
OLIVER H. PARMELEE.